United States Patent [19]

Quackenbush

[11] Patent Number: 4,628,380
[45] Date of Patent: Dec. 9, 1986

[54] ENCODER OUTPUT PHASE SELECTION SYSTEM FOR MAGNETIC DISK MEMORY

[75] Inventor: James E. Quackenbush, Chatsworth, Calif.

[73] Assignee: Computer Memories, Inc., Chatsworth, Calif.

[21] Appl. No.: 724,191

[22] Filed: Apr. 17, 1985

[51] Int. Cl.$^4$ .............................................. G11B 21/08
[52] U.S. Cl. ........................................ 360/78; 360/77; 318/561
[58] Field of Search .......................... 360/75, 77, 78; 318/561, 685, 696; 369/32, 33, 43, 44

[56] References Cited

U.S. PATENT DOCUMENTS

| 3,691,543 | 9/1972 | Mueller | 360/77 |
| 4,377,827 | 3/1983 | Rose | 360/77 |
| 4,395,742 | 7/1983 | Ostroff | 360/78 |
| 4,396,959 | 8/1983 | Harrison et al. | 360/77 |
| 4,424,543 | 1/1984 | Lewis et al. | 360/77 |
| 4,499,510 | 2/1985 | Harding et al. | 360/78 |
| 4,516,177 | 5/1985 | Moon et al. | 360/78 |
| 4,524,397 | 6/1985 | Chalmers et al. | 360/77 |

FOREIGN PATENT DOCUMENTS

| 57-88576 | 6/1982 | Japan | 360/77 |
| 58-35770 | 3/1983 | Japan | 360/77 |

OTHER PUBLICATIONS

IBM TDB vol. 19, No. 4 "Head-to-Track Synchronizing Mechanism for Magnetic Disks" Porter et al., 9/76, pp. 1393–1395.

Primary Examiner—Raymond F. Cardillo
Assistant Examiner—Steven R. Garland
Attorney, Agent, or Firm—Spensley Horn Jubas & Lubitz

[57] ABSTRACT

A head positioning system for a magnetic disk memory to position the head over a reference track so that track seeking operations can proceed from a known reference location. A plurality of control tracks are recorded adjacent the reference track with the first control track having a first type of control signal recorded thereon and the remainder having a second type of control signal. Means are provided to move the head a sub-multiple of the track spacing is to establish the head as close as possible to the centerline of the track, and to thereafter move the head integral multiples of the track spacing toward the reference track. The head is moved sequentially over the control tracks until the first type of control signal is detected. One more step then positions the head over the reference track. The sub-multiple movement capability is achieved through the use of a position encoder having a polyphase output, movement between zero crossings of the polyphase outputs being said sub-multiple. Selection of the optimal phase positions the head as close as possible to tracks centerline, and once chosen, the optimal phase is used in track seeking operations until a disturbing event or shut down and start up.

5 Claims, 12 Drawing Figures

ENCODER OUTPUT PHASE SELECTION SYSTEM FOR MAGNETIC DISK MEMORY

BACKGROUND OF THE INVENTION

1. Field of the Invention

The present invention relates to magnetic disk memories for data processing systems, and particularly to such systems wherein the position of the head arm is indicated by a polyphase or like encoder. More particularly, the present invention relates to a system for selecting the optimum output phase of such encoder for use in track following.

2. Prior Art

Magnetic disk memories with concentric data tracks are often used in data processing systems because of their large storage capacity and the speed with which data can be accessed. Large storage capacity is achieved by using many narrow, closely spaced data tracks; units having of the order of 700 tracks per inch are in common use. It will be appreciated that locating a desired track on a disk having such a high track density requires a sophisticated control system.

Advantageously, such control system may utilize a polyphase optical encoder, mechanically coupled to the head arm, to indicate the position of the read/write head with respect to the disk. In a track seeking mode, the desired track is located by counting the number of tracks crossed as the head is moved. This is done by counting the number of half cycles or zero-crossings of one phase output of the encoder.

When the desired track has been reached, the system switches to a track following mode, in which a servo system advantageously servos about the zero-crossing of a particular phase output of the encoder.

If the system is perfectly aligned, such a zero-crossing will occur where the read/write head is exactly over the centerline of a particular track. If the head moves away from the track centerline, say radially inward, the encoder output signal will change in one polarity sense, and if the head moves in the other direction (radially outward) the encoder signal will change in the other polarity sense. With such arrangement, proper track following can be achieved. For thermal correction, a track centerline servo sector may be provided on each track, having radially offset bursts that are read once per revolution. By comparing the relative amplitudes of these bursts, a fine correction can be made to the position servo.

In disc drives of very high density, the track width may often be less than 0.001 inch. It is possible that a very slight mechanical misalignment may be introduced between the head arm and the encoder, as a result of jarring of the disk drive. As a result, the situation might arise that when the head is positioned at the centerline of a track, the output of a particular encoder phase is not near zero (the preferred condition for servoing) but may even be at the crest of the encoder output, in which situation proper servoing cannot be accomplished. For example, if the encoder is at a crest when the head is positioned over the track centerline, movement of the head in either direction (radially inward or radially outward) will cause an encoder output change of the same polarity sense. Proper servoing cannot be carried out.

Thus in a disk drive in which there is factory preselection of which encoder phase is used for the track following servo operation, mechanical jarring may interrupt the head arm/encoder alignment, so as to introduce the problem just discussed. Accordingly, it is an objective of the present invention to provide a system for eliminating such problem. It is a further object of the present invention to provide a system in which, at certain times during disk drive operation (for example, at power-up), a determination is made automatically as to which available encoder phase output or portion thereof achieves best servoing (i.e., has a zero-crossing most closely aligned with the track centerline). The selected phase (or portion thereof) thereafter is used for servoing in the track following mode.

Another objective of the present invention is to provide a system for determining the optimal phase output (or portion thereof) for a head-arm encoder with respect to the use of such signal for servoing in the track following mode. Advantageously this objective is achieved by providing a system which successively uses each phase (or portion thereof) to position the head, and at each such position, uses burst information on the track to confirm whether adequate centering or track alignment has been achieved with that particular phase. The optimal phase (or portion thereof) is selected for subsequent use when servoing in the track following mode.

SUMMARY OF THE INVENTION

These and other objectives are achieved by the inventive encoder output phase selection system for a magnetic disk memory. To achieve such phase selection, an arbitrarily selected encoder output phase is used to drive the read/write head to the middle of a set of control tracks located radially outward of track zero on the disk. Each of these control tracks has a sector with a particular burst arrangement. With the head positioned using one particular encoder output phase, the head output is monitored to determine if the expected burst is detected. If not, a different encoder output phase is used to reposition the head. Successively different phases are used until the particular burst is detected.

When the occurs, offset signals are applied successively to the positioning control system to successively move the head plus and minus one-third track spacing. At each such position, a determination again is made as to whether the burst is detected. If the burst is detected in at least two such positions, each about one-third of a track spacing apart, the encoder phase then in use is provisionally elected as the phase to use for subsequent track follow servoing.

Thereafter, the head is moved radially inwardly by one track spacing amounts until track−1 is reached. This track is signified by a different burst arrangement. A final one-track spacing movement takes the head to track zero.

At track zero, which contains the normal radially offset marker bursts used for thermal track centerline correction, a final selection of the desired encoder phase is made. In particular, an attempt is made to center the head on track zero using the provisionally elected encoder phase and a track centerline correction signal derived from the radially offset marker bursts. The magnitude of this correction signal is compared with the maximum allowable correction value. Next, an encoder phase adjacent to that which was provisionally selected is used to reposition the head over track zero. Once again, track centerline correction is made using the radially offset market bursts. Once again, the track centerline correction signal magnitude is compared with that of the correction limit. The encoder output phase which resulted in the head being positioned at the centerline of track zero with the lowest track centerline correction magnitude (or the lowest ratio of that magnitude to the maximum allowable limit) then is selected as the phase to be used for subsequent track follow servoing.

DETAILED DESCRIPTION OF THE INVENTION

Figure 1:
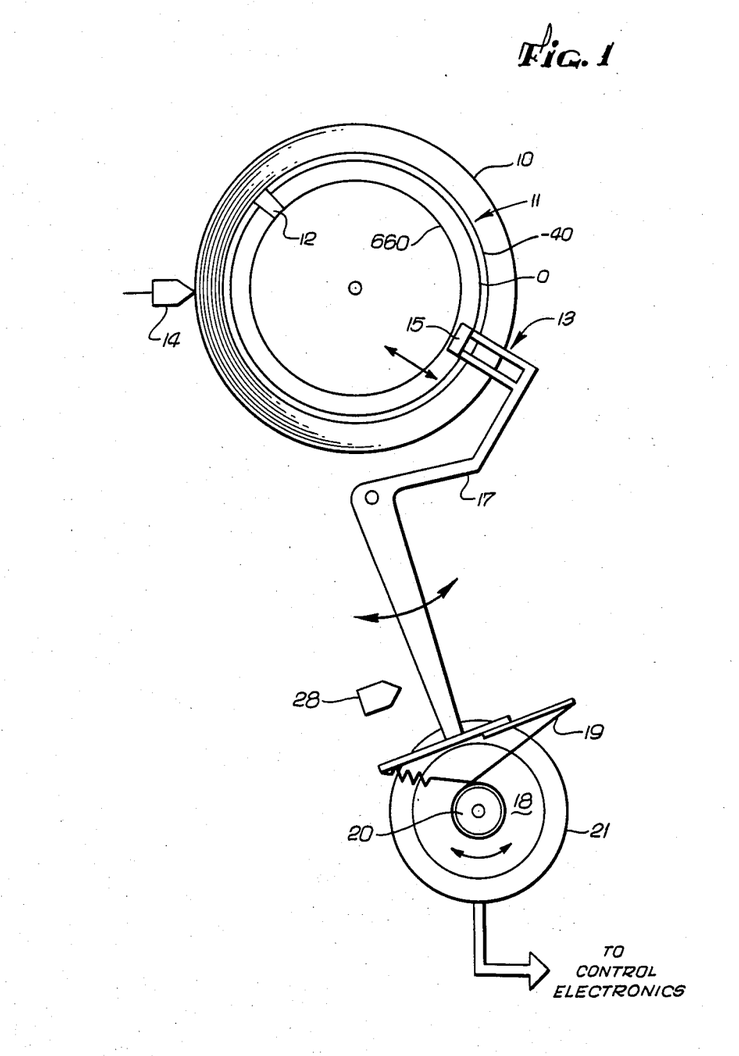
FIG. 1 is a diagrammatic plan view of a disk drive suitable for use in connection with the present invention.

Referring first to FIG. 1, which is a diagrammatic plan view of a disk drive unit which may be used in conjunction with the present invention, a disk 10 is shown on which are a plurality of concentric data tracks. Typically, there may be about 700 tracks on a 5¼ inch disk, but there may be more or less as desired. Also, the disk drive unit may include a plurality of stacked disks each having data tracks located on both sides of the disk. The disks are driven at a constant speed by a motor, not shown. Track region 11 is shown on disk 10 with an outermost track, designated as track −40, and an innermost track, designated as track 660. The reason for these designations will be explained below.

A read/write head 15 is positioned in the track region 11 by a bell crank or arm 17 on which the head is mounted. The head 15 is caused to move radially in the track region by the rotation of a capstan 20 acting on the arm 17 through a band 19, the capstan 20 being attached to the shaft of a driving motor 18. A second read/write head 15′, not shown, is located opposite the head 15 on the underside of the disk 10. The head 15′ is also mounted to the arm 17 so that the heads 15 and 15′ move together over corresponding tracks on opposite sides of the disk 10.

A shaft encoder 21, which may be an optical encoder, is also coupled to the shaft of the drive motor 18. The encoder output is comprised of two voltages, each of which varies sinusoidally with respect to drive motor shaft position. The "wavelength" of the encoder outputs is such that head 15 travels the distance of two track spaces per 360° of encoder output voltage. The two voltages are 90° out of phase resulting in one of the voltages crossing zero each half track space. The two encoder outputs are illustrated as phase 1 ($\phi_1$) and phase 2 ($\phi_2$) in FIG. 2A, which shows the amplitude of each of the two encoder outputs as a function of driver motor shaft angle relative to some arbitrary fixed reference point. Each zero crossing of one of the phases represents a head travel of one track space.

Figure 2A:
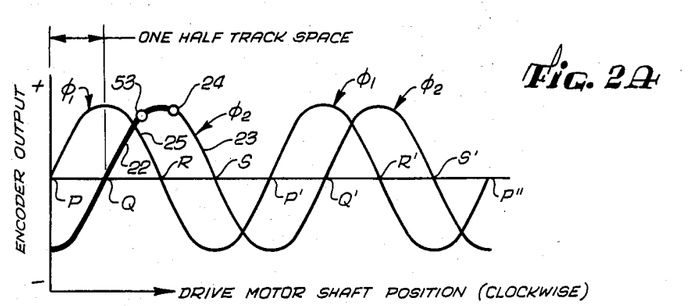
FIG. 2A shows two typical outputs of different phase from a position encoder utilized in the disk drive of FIG. 1, as a function of drive motor shaft position.

In the "track following" mode of operation the read/write head 15 is maintained within the boundaries of a particular track by a servo system which uses as an input a portion of one encoder phase output, such as the positive going half cycle 22 of the phase one ($\phi_2$) encoder output shown in FIG. 2A.

Advantageously, when the read/write head 15 is over the centerline of a particular even (or odd) track, the phase two ($\phi_2$) output signal 22 would be at the zero crossing point Q. With this encoder phase connected to a servo system driving the motor 18, if the read/write head were to move slightly radially outward away from the track centerline, the encoder output voltate 22 would rise to a corresponding positive voltage. This would cause a correction signal to be supplied to the drive motor 18 to turn it in the counterclockwise direction and thereby return the head 15 to the centerline. Similarly, if the head were to move away from the centerline in the radially inward direction, the encoder output 22 would be a negative voltage which would cause the motor 18 to rotate clockwise so as to return the head to the track centerline position.

Figure 2B:
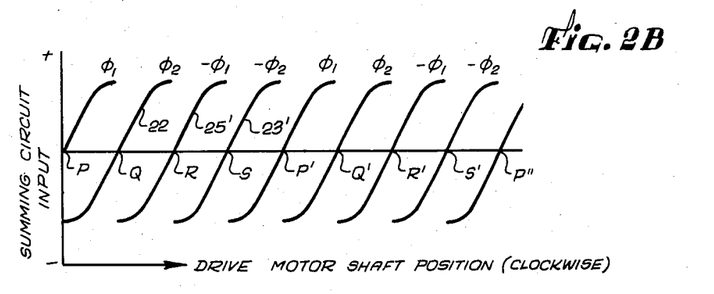
FIG. 2B shows waveforms of encoder phase signals derived from the encoder output signals shown in FIG. 2A.

It is clear that if phase two ($\phi_2$) encoder output is used for servoing in the track following mode, if the read/write head were next positioned to the adjacent odd (or even) track, the encoder phase two ($\phi_2$) output would be in the negative-going region 23 (FIG. 2A) centered about the zero crossing position S. If the head now were to move radially outward away from the track centerline, a negative voltage would be produced by the encoder, thereby causing incorrect rotation of the motor 18 (i.e., in a direction which would not correct for the offset). To compensate for this situation, each half cycle of each encoder output phase is inverted in polarity, as shown in FIG. 2B. In that instance, when the read/write head is centered on an odd (or even) track, the inverted phase two ($-\phi_2$) waveform 23′ of FIG. 2B is used for the servoing function. Correct servo action will be achieved to maintain the read/write head within the boundaries of the desired track. Such track following operation per se is conventional.

In prior art disk drives, the selection of which encoder phase output is used for servoing during track following was made during manufacture. For example, such a disk drive may have been configured at the factory to use the phase two ($\phi_2$) encoder output (FIG. 2A) for servoing during track following. Such factory preselection was satisfactory so long as the mechanical arrangement between the head arm 17 and the encoder 21 remained fixed, with the alignment being such that the selected phase output was somewhere in the vicinity of the zero crossing point (Q, S, etc., FIG. 2A) when the read/write head 15 was at a track centerline position. However, situations of misalignment sometimes occurred, typically as a result of jarring of the equipment. Indeed, a misalignment of only a few microinches of the encoder with respect to the head arm position could result in a situation where the encoder output was near a crest (e.g., at the point 24 of FIG. 2A) when the head 15 was a track centerline position. Under such a misalignment condition, the track following servo would not act properly. In particular, if the head 15 were to move radially inward, the encoder output would be a positive voltage that would cause the motor 18 to rotate in the correct direction to bring the head 15 back to the track centerline. However, if the head to move radially outwardly, the output signal 23 still would be positive and the motor 18 would be driven in the wrong direction, so as to increase the error, not correct for it. The track following servo would not operate. It is this problem which is addressed by the present invention.

Still referring to FIG. 2A, it can be seen that in the situation just described (where the encoder phase two ($\phi_2$) output is at a crest 24 when the head 15 is at a track centerline position), the other encoder output phase one ($\phi_1$) is at a zero crossing position R. Therefore, if in place of using the phase two ($\phi_2$) encoder output for the track following servo the phase one ($\phi_1$) signal were used instead, correct servoing could be achieved. The signal region 25 then would be used (inverted as shown at 25' in FIG. 2B), and proper track following would result. Thus, the present invention basically encompasses selecting and utilizing the proper encoder output phase for servoing in the track following mode. Advantageously, this selection process is made at certain times during disk drive operation, such as when the power first is turned on, or later when it is determined that proper track following is not taking place. The latter situation could arise e.g., due to different degrees of thermal expansion of the various components in the head arm and encoder mechanical assembly.

Figure 3:
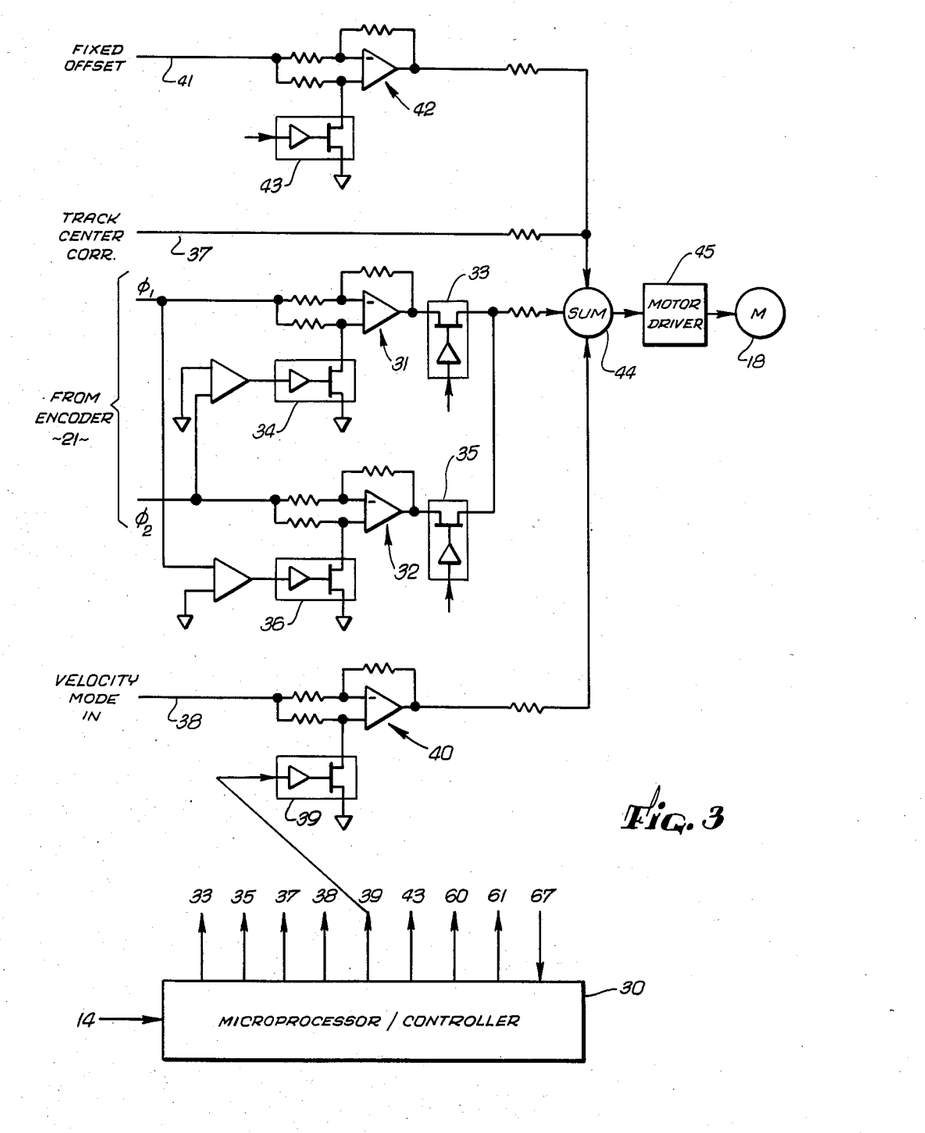
FIG. 3 is a simplified schematic diagram of the control circuitry.

The motor control electronics used for servoing are shown in FIG. 3, and are under the control of a microprocessor/controller 30 which selects the appropriate connections to cause the operation of the system as described below. Inverters 31 and 32 together with switches 33, 34, 35 and 36 are used to couple the desired encoder output and polarity to the motor 18. Switches 34 and 36 control the inverters 31 and 32 such that when, for example, switch 34 is on (which occurs when encoder phase 2 is positive) inverter 31 inverts the polarity of the phase 1 encoder output. Similarly, when switch 34 is off (which occurs when encoder phase 2 is negative) inverter 31 does not invert phase 1. Inverter 32 is similarly controlled by switch 36 except that inverter 32 inverts the polarity of phase 2 when phase 1 is negative. FIG. 2B depicts the waveforms at the outputs of inverters 31 and 32 as a function of motor shaft position. The two waveforms are superimposed for purposes of showing their relationship.

Referring back to FIG. 1, as noted above, each side of disk 10 contains perhaps 700 tracks in region 11 (11' on the underside of the disk). Within the region 11 is one data track used as a reference data track for purposes of locating any other desired data track. The reference track is called "track zero" for convenience and is located between track −40 and track 660. The tracks outboard of track zero are designated −1, −2, −3 . . . −40 and those inboard are designated 1, 2, 3 . . . 660.

The tracks 0 through 660 are data tracks and represent the memory of the system (i.e., they are used for the storage of user data). The control tracks tracks −1 through −40 are used in accordance with the present invention to assist in selection of which encoder phase output is to be used for servoing. They are also used to locate track zero on start up of the system or at any other time track zero calibration is required. They are not used for storing data.

When the disk 10 is rotating, an index signal is generated once per revolution by the action of a mark 13 on the periphery of the disk passing a detector 14 mounted adjacent to the disk. A small sector 12 on each track contains prerecorded signal bursts which are used to aid in servo phase selection for servoing; in locating track zero; and also to aid in keeping the read/write heads centered on the selected track during the track following mode of operation, when they are used for thermal compensation. The beginning of sector 12, i.e., the time that the beginning of the sector passes under head 15, coincides in time with the index signal generated by detector 14. Since the circuitry used for such thermal compensating track centerline correction is also used with the present invention, its operation will next be explained.

Figure 4:
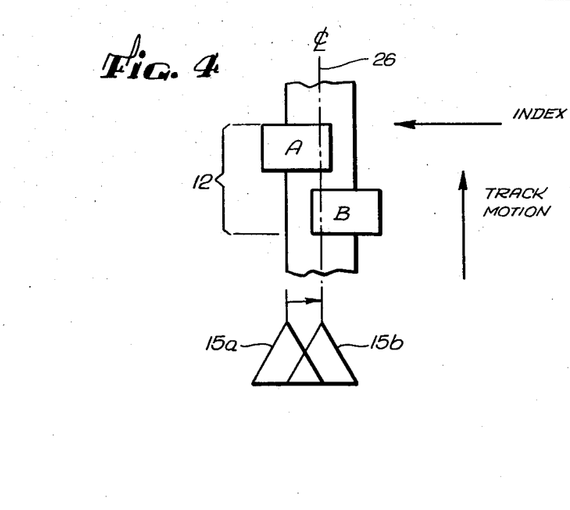
FIG. 4 is a diagrammatic view of a segment of one track showing the offset burst arrangement used for track centerline correction.

FIG. 4 shows an enlarged representation of one of the data tracks in the region of sector 12. The index signal is generated at the time the top border of sector 12 passes head 15. The triangular representations of the head 15 in FIG. 4 are intended to show positions of head 15 with respect to the centerline 26 of the track. The position 15a of head 15 shown in FIG. 4 represents the location to which the head 15 may be driven by the track following servo using a particular encoder phase output, with the encoder output at zero, but without a centerline correction being made using the servo burst. It will be noted that the head is not perfectly centered on the track, even though the encoder output may be at zero. Such offsets are common and may be caused, for example, by differential thermal expansion of the parts of the disk drive.

Figure 2C:
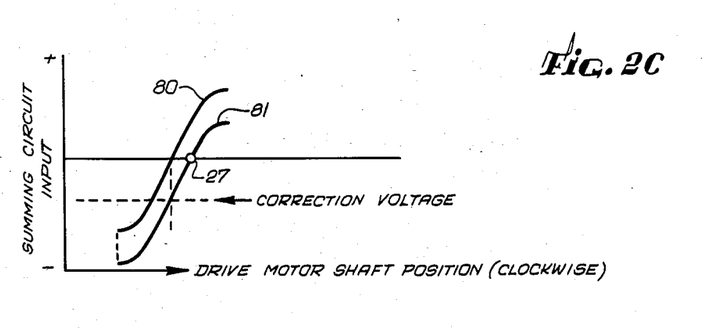
FIG. 2C shows waveforms associated with track centerline positioning of the disk drive of FIG. 1 using an encoder output signal of the type shown in FIG. 2B.
Figure 2D:
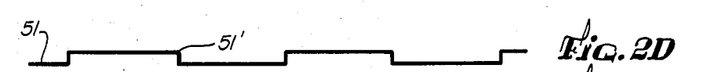
FIG. 2D and 2E show timing waveforms derived from the encoder output phase signals shown in FIG. 2A.
Figure 2E:
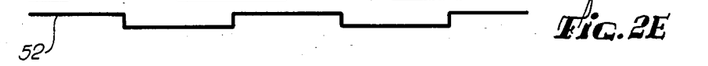

The head can be caused to move toward the center of the track by adding an appropriate DC voltage to the encoder output. This is illustrated in FIG. 2C which shows the input voltage to summing circuit 44 (FIG. 3) as a function of shaft position. Curve 80 depicts the situation where no correction is added to the encoder output and curve 81 depicts a negative D.C. voltage added to the encoder output. As can be seen, when the D.C. voltage is added, the motor shaft position corresponding to zero input voltage has moved clockwise to the point 27. Consequently, since the motor will turn until it reaches a point of zero input voltage, adding a negative D.C. voltage to the encoder output will cause the motor shaft to turn clockwise and head 15 to move inward. If the proper DC correction voltage is applied, the head 15 will move over to center on the track as shown at 15b in FIG. 4.

The track center correction voltage is generated in the microprocessor/controller 30 and is applied to the motor control circuit over line 37 (FIG. 4). In order to determine the magnitude of correction voltage required, each data track (0–660) is provided with a pair of signal bursts, A and B, in sector 12. The signal bursts are offset as shown in FIG. 4 so that if head 15 is not centered on the track as shown in FIG. 4, burst A (which occurs first in time) will be read with a higher amplitude than burst B (which occurs later in time).

Figure 5:
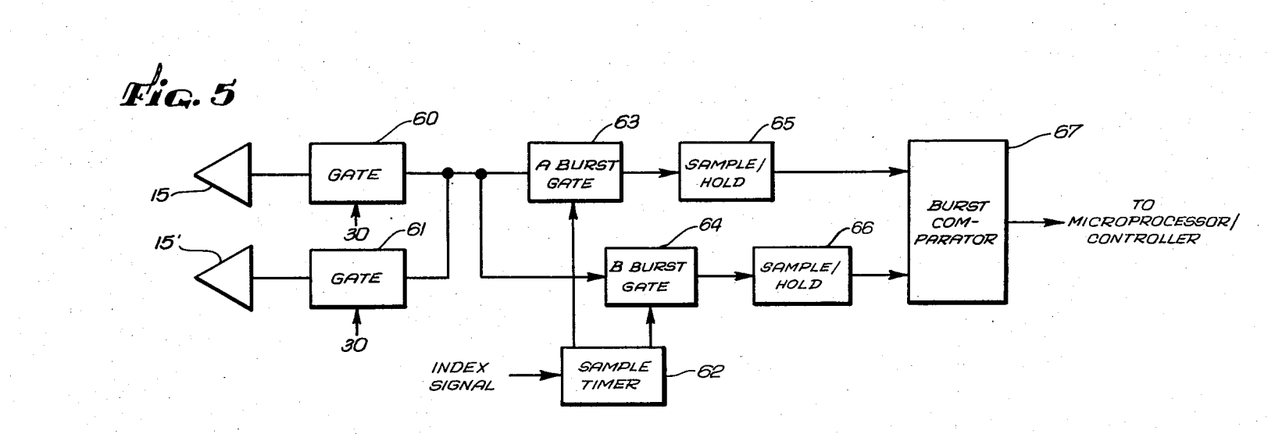
FIG. 5 is a block diagram of the burst comparator system.

Circuitry for comparing the amplitudes of the bursts is shown in FIG. 5. A pair of gates 60 and 61, under the control of microprocessor/controller 30, are used to select either head 15 or 15'. The index signal generated by detector 14 activates sample timer 62 which puts out two successive gating signals during the times bursts A and B are passing the read/write head. These signals open gates 63 and 64 respectively allowing sample and hold circuits 65 and 66 to hold the A and B burst amplitudes. Comparator 67 generates a signal whose polarity depends on the relative amplitudes of the A and B bursts. The comparator output is fed to microprocessor/controller 30 where a track center correction signal is generated and coupled to line 37.

The correction value generated is not proportional in magnitude to the difference in amplitudes of the A and B burst signals held by the sample and hold circuits 65 and 66, but rather the correction is an incremental value which is either added to or subtracted from any prior offset correction value in accordance with whether the burst comparator 67 determined that the A or B burst was larger. If there is a relatively large positioning error between the actual head position and the centerline, the addition (or subtraction) of a single unit correction value will not be sufficient to cause the head to be moved all the way to the centerline. Consequently, at the next revolution of the disk, when the sector 12 next is sensed, the burst comparator 67 will produce a signal of the same sign. Accordingly, a second unit correction value will once again be added to the prior offset correction value, making the net correction value larger still. This will continue to force the head in the same direction toward the centerline. Eventually, after a sufficient number of revolutions, the head will be moved to the actual centerline.

The offset bursts as shown on the track in FIG. 4 appear on the data tracks only (tracks 0-660) and not on the negative numbered tracks. Because of the small track spacing normally used, it is convenient to put the offset bursts related to the even numbered tracks on one side of the disk and for odd numbered tracks on the other side of the disk. Thus track centering operations for even numbered tracks will utilize head 15 and odd numbered tracks head 15'.

The above description of how a read/write head can be centered on a selected track (for thermal compensation) assumes that the head can be initially positioned reasonably close to the centerline of the track (using the encoder and track following servo) so that the A/B bursts can be detected and used to generate a correction signal. Because the head mounting structure and the associated positioning mechanism is relatively light, jarring of the disk drive or other physical factors may cause slight misalignment of the head arm with respect to the encoder. Consequently, when starting up a disk drive unit the position of the heads with respect to the tracks is not necessarily within correction range of a prior selected phase of encoder output, nor is the position of track zero known. The initial positioning of the head according to the present invention involves detection of A and B bursts on the negative numbered tracks to locate track zero and to select the most appropriate encoder output phase for subsequent use in energizing the drive motor 18 so that track following as above described can be accomplished.

Tracks −1 through −40 each contain A (first to occur) and B (second to occur) signal bursts in the sector 12, but the bursts are not positioned in the same manner as described above for tracks 0 through 660. As can be seen from the enlarged track representations in FIGS. 6 and 7, track −1 contains only a B burst centered (not offset) on the track and tracks −2 through −40 contain only an A burst, also centered. These bursts are not all on one side of the disk, however. The bursts on the odd numbered tracks are on the side of the disk facing head 15 while the bursts on the even numbered tracks face head 15', hence only every other negative numbered track on any one surface of the disk contains a burst.

Figure 6:
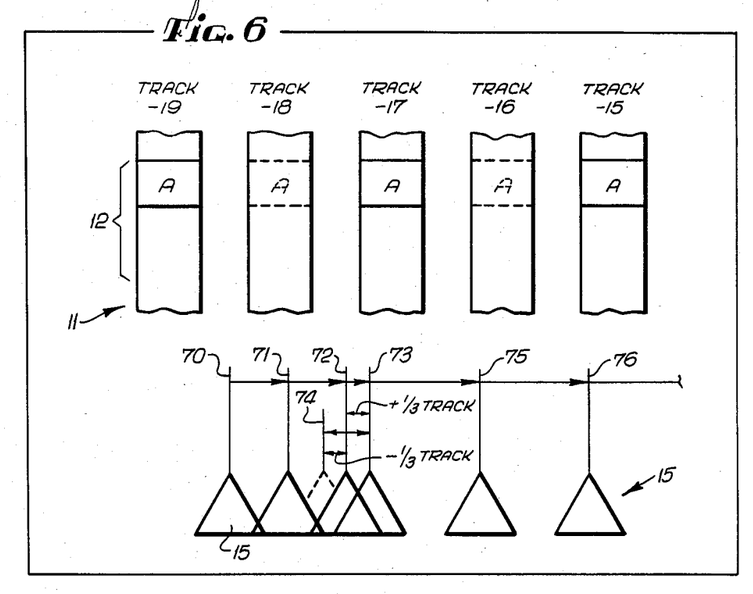
FIG. 6 is a diagrammatic view of a segment of several tracks showing the sequence of head positions during the initial encoder output phase selection process.

Upon initial start up of the disk drive, the head 15 is initially positioned in the vicinity of track −40 by applying a voltage to motor 18 through the velocity mode signal input line 38 of the motor control circuit. This voltage will drive the arm 17 against a stop 28. Because of the relatively light structure of the head positioning mechanism, the position of head 15 relative to the position of the motor shaft (capstan 20) cannot be assured with a high degree of accuracy. Jarring of the disk drive assembly could cause head 15 to be offset by as much as five or ten tracks from its expected position relative to capstan 20. Consequently, when the arm 17 is driven against the stop 28, the location of the head 15 will not be precisely known. The actual head location will be within, say, five tracks of its nominal location, e.g. between track locations −30 and −40. After the arm 17 is against the stop 28, the polarity of the signal on line 38 is reversed driving motor 18 such that head 15 will move toward track zero. This motion is stopped after about 20 tracks have been traversed, leaving head 15 positioned at about track −20. This is illustrated in FIG. 6 which shows head 15 positioned (at 70) in the vicinity of track −18.

The precise initial position of head 15 with respect to one of the negative numbered tracks in the vicinity of track −20 is a matter of chance, and the position shown is for purposes of explanation only. As an initial selection for the encoder phase to be used for serving, the positive phase 2 encoder output ($\phi_2$) is initially connected to the motor 18 (switch 35 on and switch 32 off) and that the motor shaft is at position Q (illustrated in FIG. 2B). These initial connections are an arbitrary choice preset into the microprocessor/controller 30 at the time of manufacture.

As disk 10 rotates, microprocessor/controller 30 monitors the output of comparator 67 to determine what, if any, signal burst is seen by head 15 after receipt of an index pulse from detector 14. The microprocessor/controller is seeking an A burst, however the postulated alignment of head 15 is such that no burst is seen by head 15. The A burst shown on track −18 in FIG. 6 is on the opposite side of disk 10 and would be seen by head 15' and not by head 15.

Since no A burst is detected during the passage of sector 12 under head 15, microcomputer/controller 30 generates a signal sequence which moves head 15 one-half track space toward the data tracks. Such half track space movement can be accomplished by appropriately switching which encoder one-half phase is used to drive the motor 18 in the track following servo mode. Thus, if one of the encoder outputs, either phase 1 or phase 2, is coupled to the driving motor 18 a position servo is created which provides a stable shaft position or "detent" corresponding to each zero crossing of the phase selected. In other words, if phase 1 is coupled to motor 18 such that positive encoder output voltage results in counterclockwise motion of the motor shaft, the motor will be driven to position P, P', P" (FIGS. 2A and 2B) or another corresponding position relative to the encoder output, depending on which position is the closest at the time of application of voltage.

It can be seen that if phase 1 had been selected, and motor 18 is at position P, corresponding to a certain position of head 15 relative to some track, head 15 can be moved a distance of ½ track spacing by the simple expedient of connecting phase 2 to the motor input instead of phase 1. When phase 2 is connected while the motor is at position P, a large negative voltage will be applied to the motor causing it to move clockwise until the encoder output drops to zero at shaft position Q. Head 15 can be caused to move another ½ track spacing by connecting minus phase 1 (inverted polarity) instead of phase 2. The motor shaft position will then assume position R. Conversely, if instead of connecting minus phase 1, an uninverted phase 1 were reconnected, the motor would step back to position P. Thus, it can be seen that by applying the appropriate sequence of encoder outputs to the driving motor, the read/write heads can be caused to move in increments of ½ track spacing in either direction.

Referring again to FIG. 6, the sequence used to move the head from position 70 to position 71, a distance of one-half track, is as follows. First, switch 35 is turned off, disabling the position servo which maintained the motor 18 at position Q, then a negative voltage is applied to line 38 (switch 39 being off so that inverter 40 does not invert) which causes motor 18 to turn clockwise, and finally, when the motor shaft has turned to the point where encoder phase 1 is approximately zero, (in the vicinity of position R) the voltage on line 38 is removed and switch 33 is turned on (with the switch 34 on so that negative phase 1 is used). This reactivates the motor shaft position servo and the motor is driven to position R (as shown in FIG. 28 with $-\phi_1$). Head 15, as shown in FIG. 6 will now be in position 71.

On the next rotation of disk 10 past the index signal and sector 12, microprocessor/controller 30 still will not receive an A signal from comparator 67, and the above sequence is repeated so that the motor shaft is turned to position S (switch 35 on, switch 36 on, inverted phase 2 used), and head 15 is in position 72.

This movement puts head 15 in position to produce an A signal on the next revolution of disk 10, since its head 15 now is at least partially above an odd track, namely track $-17$. Now a test is made, by moving the head respectively $+\frac{1}{8}$ track space and $-\frac{1}{8}$ track space, to determine if the head is reasonably well centered over the track. If it is, then an A burst will be detected not only at the position 72, but also at at least one other position (73 or 74) which is about ⅛ track away from the position 72.

To accomplish this test, upon receipt of the A signal, microprocessor/controller 30 alters its routine and does not step head 15 one-half track space, but rather, the microprocessor/controller causes a negative voltage to be applied to the fixed offset line 41, switch 43 being off so that inverter 42 does not invert the signal. Motor 18 is then receiving a voltage proportional to the sum of the encoder inverted phase 2 output and the voltage on line 41. These voltages are added in summing circuit 44 and applied to the motor 18 through motor driver 45. The addition of the voltage on line 41 causes the motor shaft to turn clockwise a small amount so that head 15 moves to position 73. The magnitude of the voltage applied at line 41 displaces head 15 about ⅛ track space.

On the next passage of sector 12, microprocessor/controller 30 again looks for an A burst to be indicated by comparator 67. The results of this test are retained in the microprocessor memory. Switch 43 is then turned on. When switch 43 is turned on the negative voltage on line 41 is inverted by inverter 42 so that the motor shaft turns counterclockwise moving head 15 to position 74, which is about ⅛ track space on the other side of position 72. After sector 12 has passed head 15 with the head in position 74, the microprocessor/controller compares the results obtained over the three rotations of disk 10 with head 15 in positions 72, 73, and 74, respectively.

If an A burst was detected on all three revolutions, the voltage on line 41 is removed causing head 15 to move back to position 72. In this case, the head 15 was quite closely centered on the track $-17$ since the A burst was also picked up when the head was moved both ⅛ track inward and ⅛ track outward. In this event, the phase $-Q_2$ used to locate the head 15 at the position 72 is known to be usable as the phase for subsequent track following servoing.

If an A burst is detected when head 15 is at positions 72 and 74 only, the voltage on line 41 is maintained and switch 43 is kept energized holding head 15 at position 74. The phase $-Q_2$ still is usable, but the head 15 was not quite centered on the track $-17$ in the absence of a correction voltage on the line 41. Similarly, if an A burst is detected when head 15 is at positions 72 and 73 only, the voltage on line 41 is maintained, and switch 43 is turned off causing head 15 to move back to position 73. Again the phase $-Q_2$ is provisionally selected.

Because of the assumed initial position of head 15 at 70 in the example of FIG. 6, in this case an A burst will be detected at positions 72 and 73 only and thus the head 15 will be moved to position 73 as a result of the comparison just described.

The result of the operations to this point is a provisional selection of which encoder output phase will locate the head 15 near the center of a track and thus of which encoder output phase should be used for track follow servoing. The system now is in condition to locate track zero. The purpose of the selection of position as between positions 72, 73 and 74 is to assure that the head/track relationship is such that there is some margin for positioning errors of the head as track zero is being searched for.

During the revolution of disk 10 following the repositioning of head 15 at position 73, head 15 is stepped one full track space to position 75 in a manner similar to that used to step the head from position 70 to 71, except that the voltage applied to line 41 is maintained until the drive motor shaft position arrives at position Q'. Phase 2 is coupled to summing circuit 44 with inverter 32 in its non-inverting mode and switch 35 on. The voltage on line 41 is maintained.

Figure 7:
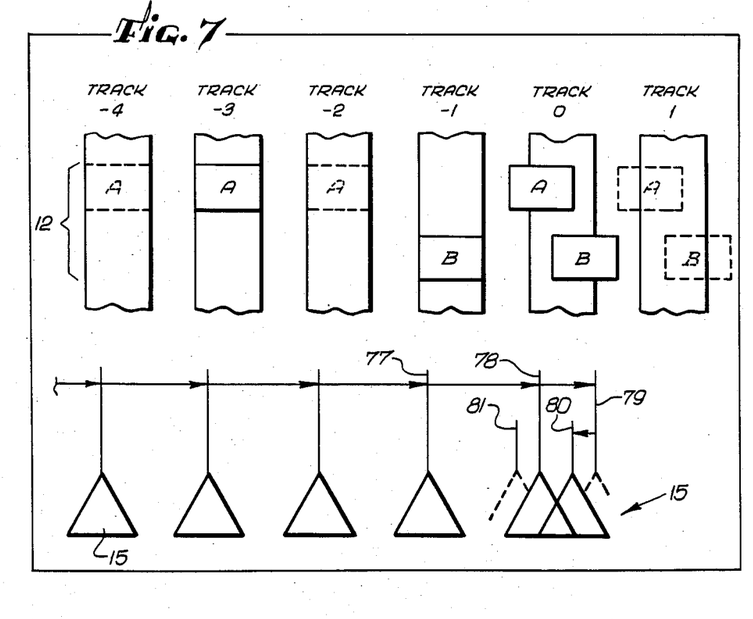
FIG. 7 is a diagrammatic view of a segment of several tracks in the vicinity of track zero showing the sequence of head positions in the final encoder output phase selection process.

When head 15 is in position 75, gate 60 is opened and gate 61 closed connecting head 15' to the input of the burst comparison circuit. Head 15' is physically located also at position 75 since it is mounted to bell crank 17 as is head 15. Head 15' is, as noted earlier on the opposite side of disk 10 and will detect the A burst on track $-16$ when sector 12' passes the head. After detection of the A burst on track $-16$, the heads are moved one more track space to position 76 and head 15 reconnected. This sequence is continued, stepping the heads one track space per revolution of disk 10 until, as shown in FIG. 7, a B burst is detected by head 15 at position 77

(at track −1). A B burst causes the polarity of the output of burst comparator 67 to change alerting microprocessor/controller 30 that the next track is track zero. Upon detection of the B burst on track −1, the heads are stepped one final track space to track zero (position 78).

At track zero, which contains the radially offset A and B bursts usually used for track centerline thermal correction, a further procedure is carried out to finally select the proper encoder phase to be used for subsequent track follow servoing. This procedure makes use of the radially offset A and B bursts, and takes into account the extent of track centerline correction which can be introduced via the voltage on the line 37 (FIG. 3).

To prepare for this operation, an initial determination is made as to the extent of correction that can be introduced into the track following servo by voltage provided on the line 37. Advantageously this is done under control of the microprocessor/controller 30 prior to carrying out the encoder phase selection process.

To accomplish this, the system first establishes a pair of digitized phase signals 51, 52 (FIG. 2A) which are true respectively when the phase one and phase two signals are positive.

Next, an arbitrary phase is selected (say phase two) and the circuitry of FIG. 3 is used in the track following mode to drive the motor 18 to a position Q. Next, the microprocessor/controller 30 incrementally increases the track centerline correction voltage on the line 37, while monitoring the polarity of the digitized phase signal 51 associated with the other phase one. As soon as the voltage on the line 37 becomes sufficiently great to cause the digitized phase signal 51 to go from true to false (at the transition 51' in FIG. 2A) the voltage 37 is stored. Since this is the amount of correction voltage which will effectively displace the encoder phase signal 22 by an amount equal to its crest amplitude, this voltage sets an outside limit on the amount of correction voltage which can be used to correct for a track centerline error resulting when a particular encoder phase output is used by itself for track follow servoing. As a precaution, some maximum value less than this is used in practice. For example, the maximum correction value may be, say 90% of the measured value. Thus the value shown at 53 in FIG. 2A indicates the preferred maximum limit of correction voltage which can be used to center the head 15 on a particular track when using the positive phase two for servoing. This maximum correction value is determined for both phase one and phase two in advance of the encoder phase selection process, and is then used when the head is moved to track zero (FIG. 7) in connection with making the final selection of the encoder phase to be used for servoing.

In the example of FIGS. 6 and 7 described above, the head 15 was stepped from the position 73 to the position 78 while still maintaining the offset voltage on the line 41 which offsets the head by approximately one-third track spacing toward the center of the disk. That offset voltage now is removed, and a test is made to determine whether the provisionally selected phase ($-\phi_2$), or the next phase in the direction of the one-third track correction voltage applied on the line 41 (herein the phase $\phi_1$) more closely positions the head 15 to the centerline of track zero.

To accomplish this test, with the head at position 78 (that is, with phase $-\phi_2$ selected and the one-third track offset value on the line 41 still applied), the head is advanced by a half-track spacing to the position 79 (by switching to the next phase $\phi_1$, FIG. 2B). The one-third track correction signal on the line 41 then is removed, thereby positioning the head 15 back to the position 80 shown in FIG. 7.

Next, the track following servo is run in its normal correction mode using the encoder phase $\phi_1$ and using the outputs of the radially offset A and B bursts to move the head 15 to the center of track zero. Some track centerline correction voltage will be produced on the line 37 to accomplish this correction. The magnitude of that correction voltage then will be compared, in the microprocessor/controller 30, with the maximum voltage (see 52' in FIG. 2A) which was earlier established as being the desired maximum limit for the correction voltage. The result of this comparison is temporarily stored in the microprocessor/controller 30.

Next, the head 15 is stepped back by one-half track to the position 81 in FIG. 7, by switching to the phase ($-\phi_2$) which was provisionally selected (FIG. 6) to be used as the phase for servoing. Once again, with the head 15 at the position 81, the system is run in the normal track centering mode using the radially offset bursts A and B in track zero. Again, a track centerline correction voltage will occur on the line 37. And once again, this correction voltage is compared with the maximum limit voltage that had previously been determined. The result if this comparison then itself is compared with the result of the comparison made when the head was at the position 80. Whichever position resulted in the smaller track centerline correction voltage on the line 37 (as compared with the maximum limit correction) then is selected. That is, the encoder phase which was used to achieve that head position is selected as the phase for track follow servoing. For example, if at position 80 (phase $\phi_1$) the track centerline voltage was 75% of maximum, whereas at position 81 (phase $-\phi_2$) the track centerline correction voltage on the line 37 was 15% of maximum, the position 81 is preferred and the phase $-\phi_2$ is selected for servoing.

The testing at track zero need not be limited only to the provisionally selected phase and the adjacent phase in the direction of the applied one-third track offset on line 41. Alternatively, other phases could also be checked. In the example just given, the phase $-\phi_1$ also could be checked. However, it is likely that the optimum phase will be either the provisionally elected phase or the next phase in the direction of the one-third track offset. If no offset voltage was applied on the line 41, meaning e.g., that the position 72 (FIG. 6) resulted in a near track centered situation, then at track zero the provisionally elected phase may be used with no further testing. Alternatively, testing of the nature just described could be carried out at track zero for the provisionally elected phase and for the next adjacent phases in the inward and outward direction.

The result of the foregoing operation is that the optimum encoder output phase has been selected for subsequent track follow servoing.

If desired, the embodiment of the invention as described above can be modified within the spirit of the invention by eliminating the A bursts on the even negatively numbered tracks. If such is done, instead of sequentially stepping one track at a time toward track −1, i.e. −18, −17, −16 etc., two track steps are taken, i.e. −17, −15, −13, etc. After reaching track −1, the two embodiments are the same.

Figure 8:
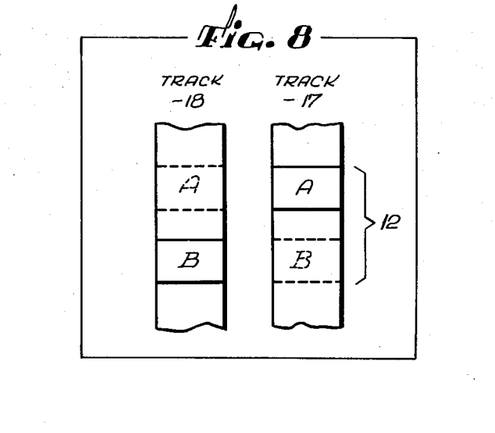
FIG. 8 shows a short segment of two control segments according to a third embodiment of the invention.

A second modification of the invention involves using both A and B bursts on tracks −2 through −40. According to this modification, the even numbered tracks in region 11 (the top side of the disk) have a B burst recorded thereon while the odd numbered tracks (as in the first embodiment) have A bursts. The bursts on the tracks in region 11' (the underside of the disk) has the opposite pattern, i.e., the odd tracks have B bursts and the even tracks have A bursts. This is illustrated in FIG. 8 where the sector 12 of tracks −17 and −18 are shown. The dotted lines indicate on the underside of the disk.

In operation, the microprocessor/controller 30 alternates between heads 15 and 15' in the initial track alignment sequence seeking an A burst when head 15 is connected (as initially described), and also a B burst when head 15' is connected. Referring to FIG. 6, in positions 70 and 71 head 15 will see a B burst and 15' an A burst. When position 72 is reached, the desired pattern is detected. The operation from this point on is as described above.

The redundancy in this modification assures that both heads 15 and 15' are in a position to detect the control signals as the heads are stepped toward track zero.

What is claimed is:

1. A system for selecting which encoder output phase is to be used for track servoing in a magnetic disk drive memory in which the position of the read/write head is indicated by an encoder having plural output phases, comprising:

a region of concentric control tracks on a disk of said memory situated adjacent to the data storage area of said disk, alternate ones of said control tracks containing a certain marker burst pattern, first means for moving said head to the middle of said region of said control tracks using one of said encoder output phases, second means for determining whether said marker burst pattern is detectable by said head at the position to which it was moved by said first means, (a) and if so, for then offsetting said head in the radially inward and radially outward directions respectively by about one-third track spacing, and determining at each such position if the marker burst pattern is still detectable by said head, (b) and if not, for thereafter repositioning said head utilizing other encoder output phases, until one such phase results in positioning of the head such that said marker burst pattern is detected at such position and at at least one other position offset by plus or minus approximately one-third track spacing therefrom, and means for provisionally electing as the phase for subsequent track follow servoing that encoder phase which resulted in burst detection at the position reached using that encoder phase and at at least one other position plus or minus about one-third track spacing therefrom.

2. A system according to claim 1 wherein a certain data track has radially offset marker bursts used for track centerline correction, and further comprising:

means for moving said head by track spacing related intervals from the position at which such provisionally elected encoder output phase selection was made to said certain data track, means for using the marker bursts in said certain data track to correct the centerline position of said head from the location to which it was moved by said means for moving, using (a) the provisionallly elected encoder phase output, and using (b) at least one other output phase, and means for selecting as the encoder phase output to be used for subsequent track follow servoing that phase which resulted in a head position requiring minimum track centerline offset correction magnitude.

3. A method for selecting the optimum encoder output phase for positioning the head of a magnetic disk memory in which the head position is indicated by an encoder having plural output phases, which comprises:

(a) recording a plurality of equally spaced control tracks on at least one surface of a disk in a magnetic disk memory, the first of said control tracks having a first control signal recorded thereon and alternate ones of the balance of said control tracks having a second control signal recorded thereon;

(b) locating the head of said disk memory within the region of said disk containing said balance of said control tracks;

(c) monitoring the output of said head while sequentially moving said head a submultiple of the spacing of said control tracks toward said first control track until a said second control signal is detected, said moving being accomplished by sequentially using different output phases of said encoder;

(d) moving said head an incremental offset amount less than said submultiple both toward and away from said first control track, while monitoring the output of said head;

(e) moving said head back to the position before said incremental offset motions if said second control signal is detedted at both of said incremental offsets;

(f) moving said head to the incremental offset position where said second control signal was detected if said second control signal was not detected at both incremental offsets;

(g) sequentially moving said head toward said first control track in steps equal to the spacing between said control tracks until said first control signal is detected and the one additional step;

(h) if an incremental offset is being maintained, moving said head one of said submultiple steps in the direction of said offset and removing said offset; and (i) provisionally selecting as the encoder output phase for head positioning that encoder output phase which was in use at step (c) when said second control signal was detected.

4. A method of positioning the head of a magnetic disk memory as recited in claim 3 where the submultiple is one-half, and wherein a certain data track has track centerline offset correction information recorded thereon, said method including the further steps of:

using said provisionally elected output phase to position said head at said certain data track;

measuring the centerline offset of said head utilizing said recorded offset correction information;

positioning said head at said certain data track using another of said encoder output phases, which other phase is nearest said provisionally elected phase;

repeating said measuring step; and selecting as the encoder output phase for positioning that encoder phase which produced minimum centerline offset as determined by said measuring steps.

5. In a disk drive in which the head arm position is indicated by an encoder having at least two outputs of different phase, and in which during operation in a track following mode the head is maintained in a position near the centerline of the track by servoing near a zero crossing of one of said phases, a method for selecting which phase of encoder output is to be used for optimal servoing, comprising:

providing on a disk of said drive a zone of non-user-data tracks, said zone including alternate tracks having a distinctive burst pattern;

moving said head to a position within said zone utilizing one of said encoder output phases;

determining if at said position said head picks up said burst pattern, thereby indicating that said head is at least partially located at one of said alternate tracks having said burst pattern;

if such burst pattern is not detected, moving said head radially inward or outward by approximately one-half track width steps, using others of said encoder output phases, until a position is located at which said burst pattern is detected, indicating that said head is located at one of said alternate tracks, thereafter moving said head radially inwardly and outwardly respectively by approximately one-third track distance by using an offset correction signal and determining at each such plus or minus one-third track distances if said burst pattern is still detected, if at said plus or minus one-third track distance said burst is still detected, provisionally selecting as the phase for subsequent track following that phase which was used to locate said head at said track, if not, maintaining said plus one-third of minus one-third offset correction signal on, moving said head in one-half or one track intervals to a track of user data containing track centerline offset correction information thereon, using said track centerline information to center said head, removing said plus one-third or minus one-third track offset correction signal and centering said head using said track centerline information;

comparing the amount of correction required for centering in each of the prior two steps, and utilizing as the selected phase for subsequent positioning that phase at which the least centering correction was required.

* * * * *